Aug. 10, 1954 V. V. MASON ET AL 2,685,828
FORMATION OF PELLETS FROM SHEET MATERIAL
Filed Feb. 5, 1951 7 Sheets-Sheet 1

INVENTORS.
VEYNE V. MASON,
HERBERT L. GLAZE,
By H. Calvin White
ATTORNEY.

Aug. 10, 1954     V. V. MASON ET AL     2,685,828
FORMATION OF PELLETS FROM SHEET MATERIAL

Filed Feb. 5, 1951     7 Sheets-Sheet 4

INVENTORS.
VEYNE V. MASON,
HERBERT L. GLAZE,
By H. Calvin White
ATTORNEY.

Patented Aug. 10, 1954

2,685,828

UNITED STATES PATENT OFFICE 2,685,828

FORMATION OF PELLETS FROM SHEET MATERIAL

Veyne V. Mason, Los Angeles, and Herbert L. Glaze, Pasadena, Calif.; said Glaze assignor to said Mason Application February 5, 1951, Serial No. 209,482

28 Claims. (Cl. 93—1)

This invention relates to improved apparatus for forming pellets or balls of crumpled sheet material, and particularly pellets of paper to be used in the filtering of oil. More specifically, the invention is directed to certain improvements in the pellet forming apparatus of applications numbers 160,414, filed May 6, 1950 on Engine Oil Filter, now Patent No. 2,549,698, issued April 17, 1951; and 209,481, filed February 5, 1951 on Formation of Pellets From Sheet Material, both filed by Veyne V. Mason, co-inventor and owner of the present invention.

The above applications disclose apparatus for forming pellets of paper or other sheet material by first deforming and progressively constricting the material toward an axis and into a preferably elongated folded mass, and then axially compacting the mass into pellet form. Preferably, the sheet is first inserted into a compaction chamber, as by a relatively movable insertion plunger, and then compacted within the chamber by a compaction plunger. The sheet may be formed into its elongated condition by forcing it through a relatively restricted opening in a forming unit or die, which may take the form of a converging funnel-like unit from which the folded elongated mass is directed into an open end of the compaction chamber.

A first object of the present invention is to provide an improved construction for the funnel-like forming unit in an arrangement of the above character. Specifically, the paper constricting or folding effectiveness of the unit may be improved by forming the unit of a plurality of elongated converging members spaced in a manner to pass between them the longitudinal folds in the sheet as it is forced through the unit. Preferably, each of these members has a first edge spaced radially inwardly from an adjacent member at one side and a second edge spaced radially outwardly from an adjacent member at the opposite side, so that all folds in the paper are directed in a common circular direction to assure uniform and extremely effective folding of the successive sheets passed through the unit. The fold passing spaces may become progressively wider toward the reduced exit end of the forming unit to accommodate the progressively enlarging folds. Also, a particular feature of the invention involves the provision of one or more lugs at the entrance end of the forming unit for engaging the sheet and starting a fold in it during the initial stages of its movement into the unit.

An additional object of the invention is to provide improved means for ejecting a compacted pellet from the compaction chamber after its formation. For this purpose, we may construct the inner wall of the chamber, toward which the compaction plunger moves in forming the pellet, in the form of a third plunger element adapted for relative movement through the chamber after the compaction operation to positively eject the pellet from the plunger. At the outside of the chamber, we may provide additional means for then displacing the pellet in a discharge direction, as by producing a jet of air passing across the ejection end of the chamber.

Structurally, the apparatus may include a pair of body sections relatively movable both toward and away from each other and transversely, one of the sections carrying the compaction chamber and the other carrying the insertion and compaction plungers. Preferably, the relative transverse movement of the sections is rotational, the insertion plunger being movable into the chamber upon relative reciprocation of the sections in a first relative rotary position, the compaction plunger being so movable in a second rotary position, and the ejection plunger being operable in a third or ejecting position. In the presently preferred form of the invention, one of the sections takes the form of a rotary turret carrying one or more compaction cylinders, and the other section is a reciprocable head carrying the insertion and compaction plungers.

A still further object of the invention is to provide pellet forming apparatus of the above character and which is adapted for entirely automatic operation. That is, the various plungers and other elements are automatically operable in predetermined timed relation to successively crumple and compact a series of sheets of paper or the like and deliver the compacted pellets to a discharge location.

Further features of the invention have to do with apparatus for successively feeding individual sheets of material from a supply stack to a location from which they are inserted into the compaction chamber. Delivery of the sheets is preferably effected by a member having a suction pick-up portion and mechanically movable from a pick up location to the pre-insertion location. A related feature of the invention concerns certain stack advancing mechanism by which the top or end sheet in the supply stack is at all times maintained at substantially a predetermined location for proper pickup by the delivery member.

The above and other features and objects of the present invention will be better understood from the following detailed description of the typical embodiment illustrated in the accompanying drawings, in which.

Referring first to Figs. 1 through 4, the illustrated machine includes a frame 10 by which a turret 11 is mounted for rotation about a vertical axis. The turret carries a number of tubular compaction barrels or cylinders 12, typically six as shown, within which individual sheets 13 of paper are successively compacted into ball shaped pellets. A plunger carrying head 14 is vertically reciprocable above turret 11 to successively displace the individual paper sheets through a pair of frame mounted forming assemblies 15 into the cylinders, and then compact the sheets within the cylinders. Specifically, each sheet of paper is inserted into the compaction cylinder on a first down stroke of the head by an insertion plunger 16, and is then compacted on a subsequent stroke by a compaction plunger 17. The compacted paper pellet is then ejected from the cylinder by upward movement of a bottom plunger 18 in the cylinder. Between successive insertion, compaction and ejection operations in a particular cylinder, turret 11 is rotated to in each instance properly position the cylinder for the desired operation. The paper sheets 13 are successively fed from a pair of supply stacks 13a to their pre-insertion locations above forming assemblies 15 by a movable paper delivery unit or carriage 19.

The lower portion of frame 10 includes a pair of spaced upstanding side plates 20 and 21 rigidly interconnected at their upper and lower ends respectively by a pair of horizontal frame members 22 and 23. The side plates 20 and 21 may be strengthened by a pair of central vertically extending inner web members 24. Above side plates 20 and 21, the frame includes a pair of spaced upwardly projecting cylindrical posts 25 rigidly connected in any suitable manner to the lower portion of the frame. For mounting these posts, horizontal frame member 22 may be provided at its opposite sides with a pair of upstanding clamp portions 26 adapted to extend about the inner sides of posts 25 at their lower ends. A pair of outer clamp sections 27 are adapted to be tightened to these clamp portions 26 of the horizontal frame member 22 by screws 28, to tightly grip the lower ends of posts 25 and rigidly mount them in the illustrated positions. At their upper ends, posts 25 are rigidly interconnected by a structure very similar to that provided at their lower ends, including a horizontal plate-like frame member 29 having depending clamp portions 30 at its opposite sides to which outer clamp sections 31 are attached.

The machine may be driven by any suitable power source, as for instance by an electric motor 32 through a belt 33 and frame carried pulley 34. This pulley is rigidly attached to a shaft 35 journalled in bearing 236 and carrying at its inner end a relatively small gear 36. Gear 36 engages and drives a larger and heavier gear 37, which serves also as a fly wheel. Gear 37 is rigidly carried by shaft 38 journalled in frame carried bearing 39 and extending entirely through the bearing to carry at its outer end three cams 40, 41 and 42. These cams act against three air valves 43, 44 and 45 for controlling the admission of compressed air to various parts of the machine, as will be brought out more in detail at a later point.

Figures 1, 25, 26:
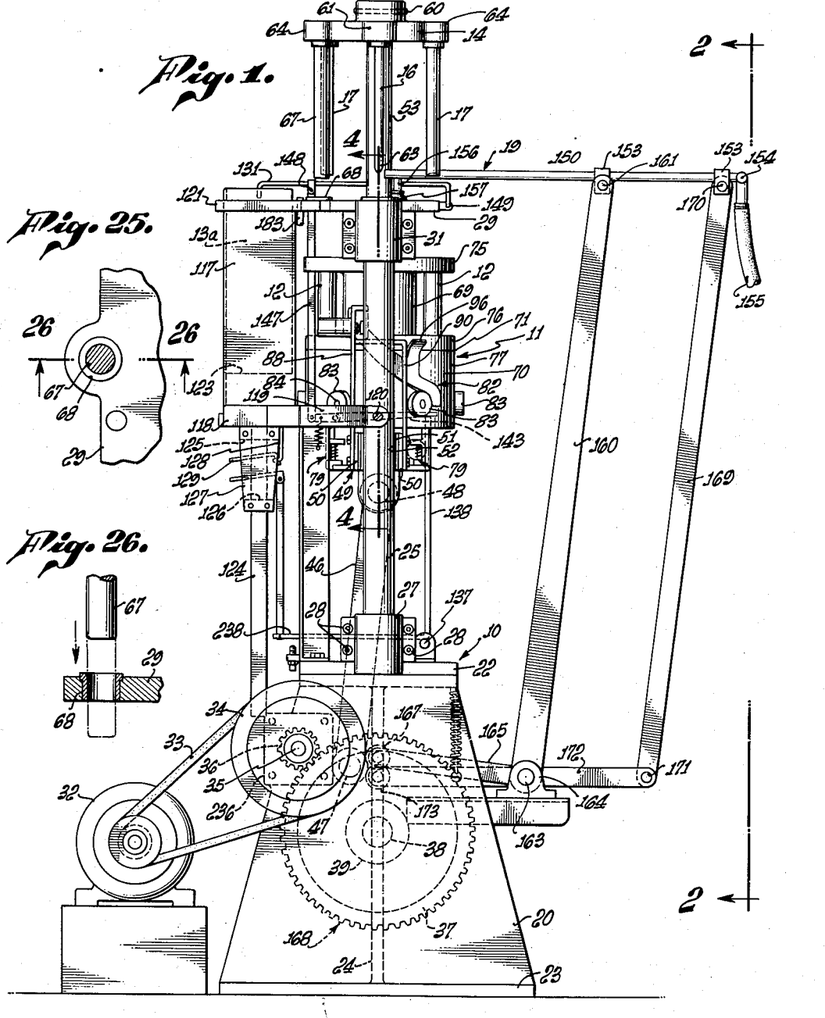
Fig. 1 is a side view of a machine embodying the invention and particularly intended for the formation of paper balls to be used in the filtering of oil.
Fig. 25 is a horizontal section through the head carried locating pin and showing the frame carried bushing within which the pin is receivable.
Fig. 26 is a vertical section taken on line 26—26 of Fig. 25.
Figures 2, 27, 28, 29, 30:
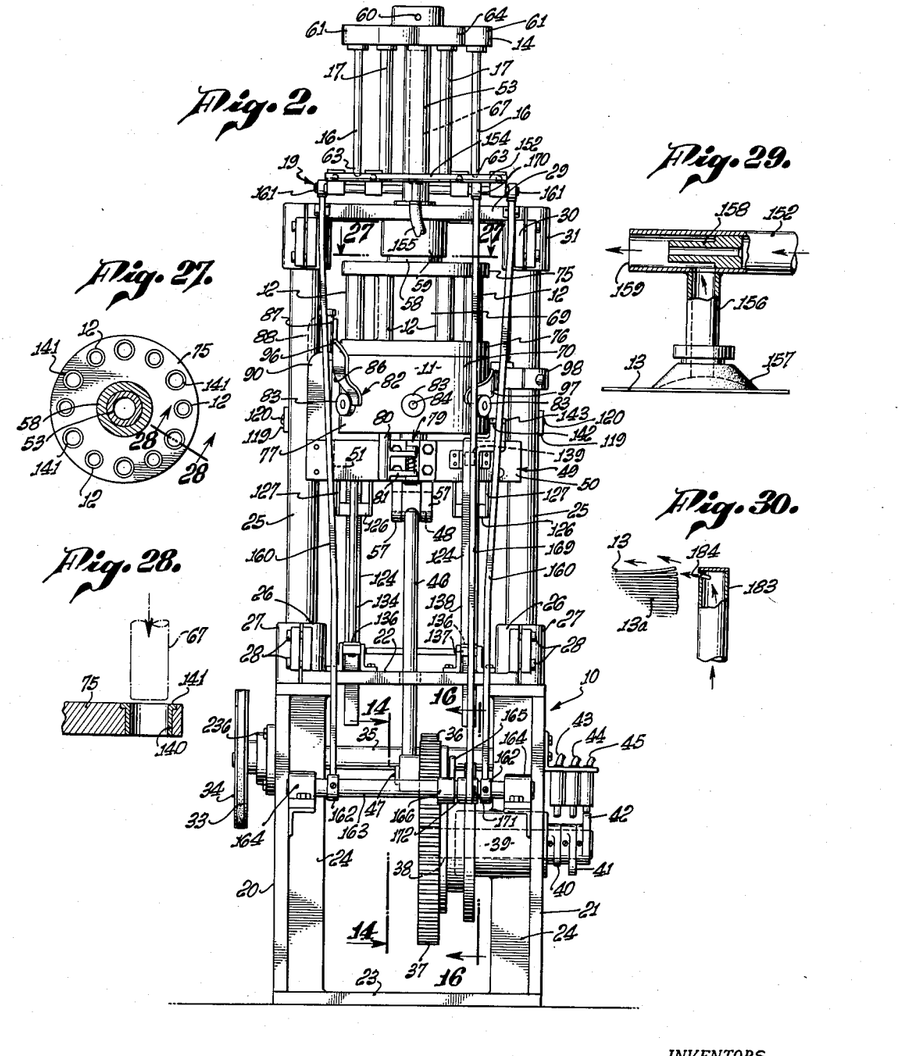
Fig. 2 is a rear view of the machine taken on line 2—2 of Fig. 1.
Fig. 27 is a horizontal section taken on line 27—27 of Fig. 2 and showing especially the arrangement of plunger receiving openings at the upper side of the turret.
Fig. 28 is an enlarged fragmentary section taken on line 28—28 of Fig. 27.
Fig. 29 is an enlarged fragmentary view of one of the paper holding elements.
Fig. 30 is a view of the paper ruffler.
Figure 3:
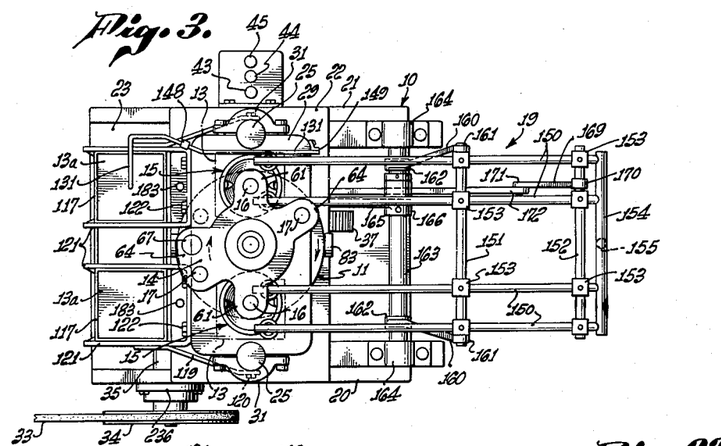
Fig. 3 is a plan view of the machine.
Figures 10, 11, 12, 13:
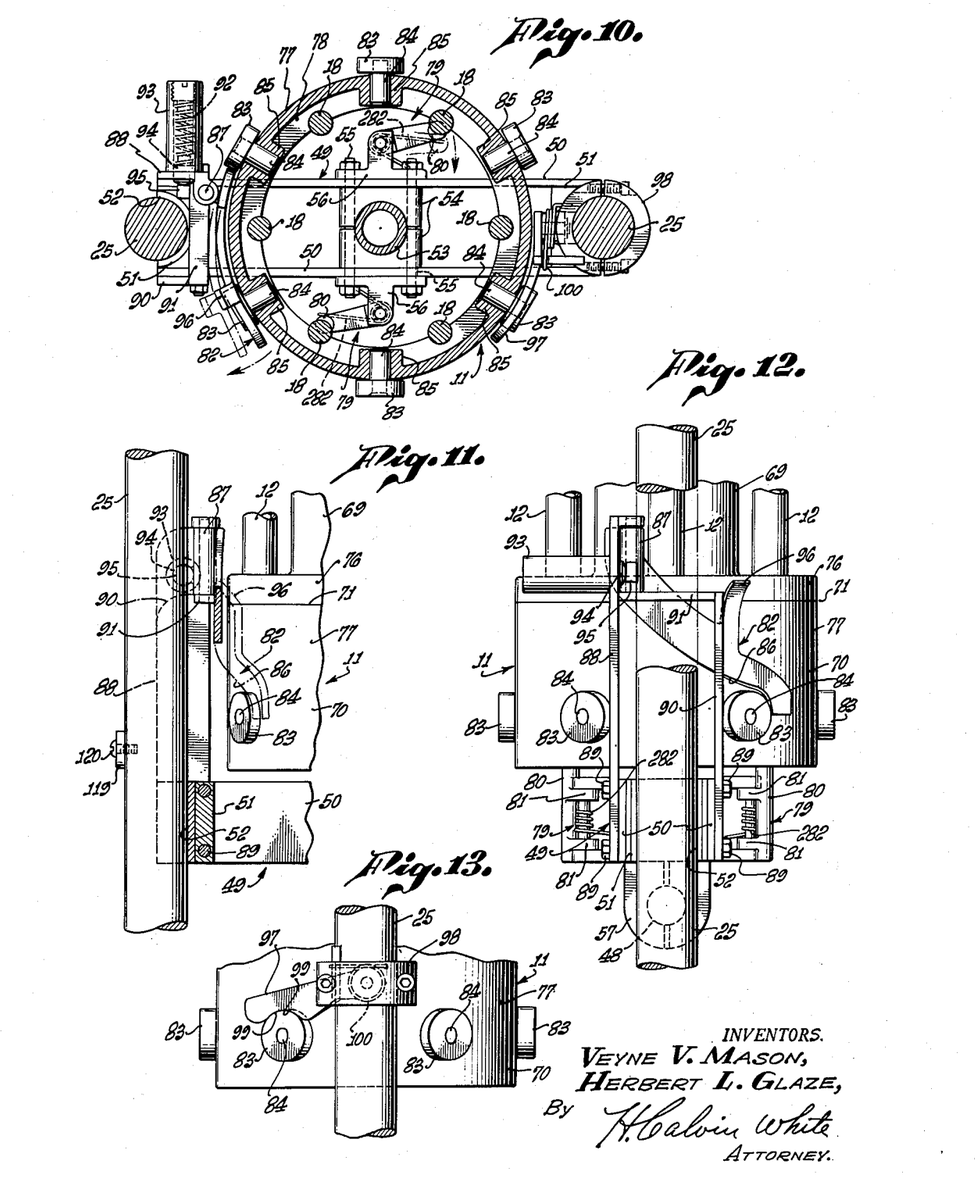
Fig. 10 is a horizontal section through the lower part of the rotating turret taken on line 10—10 of Fig. 4.
Figs. 11 and 12 are views of the turret and associated cam by which the turret is rotated between its various positions.
Fig. 13 is a fragmentary view taken at the outside of the turret and showing especially the detent for maintaining the turret in its various positions.

Gear 37 is eccentrically connected to the lower end of a connecting rod 46 by pin 47. The upper end of this connecting rod is pivotally attached by a pin 48 to a cross-head 49 extending between and guided for vertical reciprocation by the two upstanding posts 25. Referring especially to Figs. 2 and 10, cross-head 49 may comprise a pair of spaced elongated side plates 50 between which are rigidly carried, at their opposite ends, a pair of blocks 51 for engaging and sliding along posts 25. Each of these blocks 51 has a semi-cylindrical recess 52 of a curvature corresponding to that of the posts to positively guide the cross-head for only vertical movement.

Reciprocation of the cross-head is transmitted to the upper plunger carrying head 14 by a vertical shaft 53 which extends upwardly through the center of rotatable turret 11. The lower end of shaft 53 is suitably connected to the cross-head, as by clamping between a pair of clamp sections 54 received between the central portions of cross head side plates 50. These clamp sections may be attached to the side plates by a pair of bolts 55, which preferably also serve to retain to the opposite sides of the cross head a pair of brackets 56, whose function will be brought out at a later point. Clamp sections 54 may carry a pair of depending sectionally formed lugs 57, through which pin 48 extends for connecting the cross-head to the upper end of connecting rod 46.

Figures 4, 5, 8, 9:
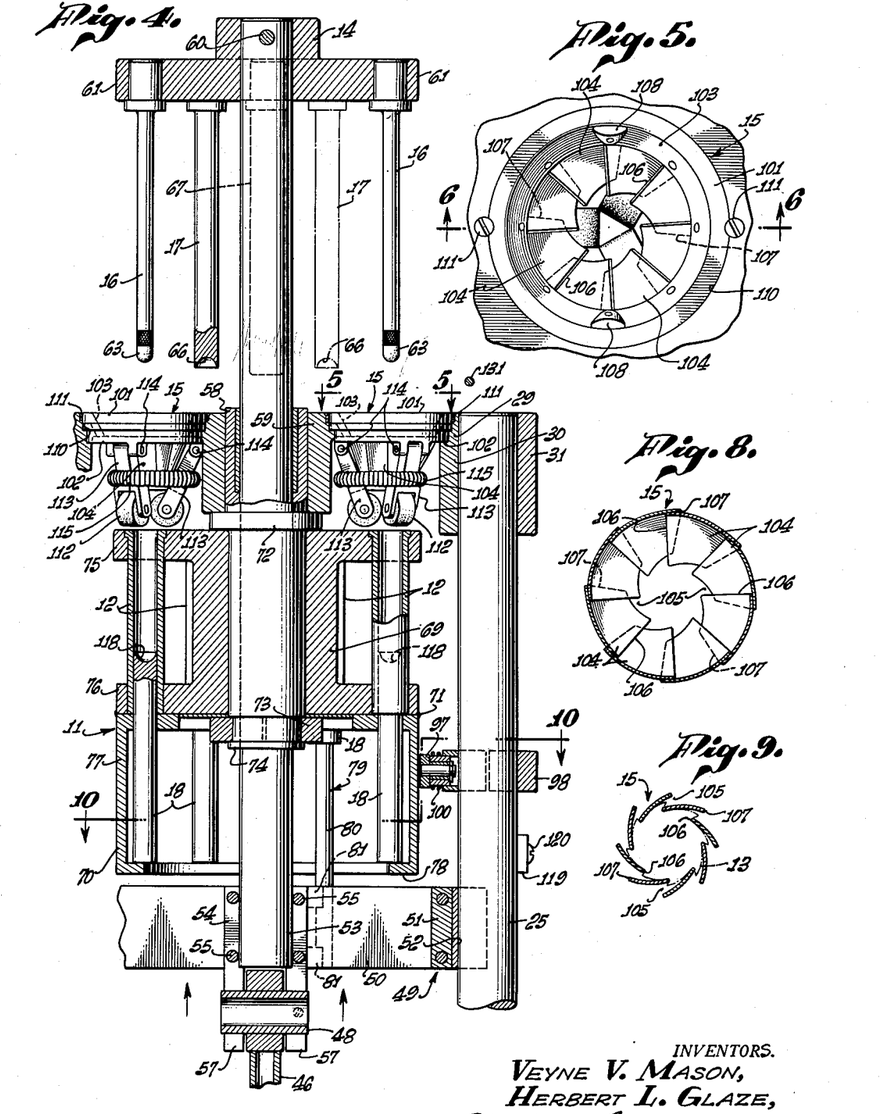
Fig. 4 is an enlarged fragmentary vertical section through the rotating turret and paper head and taken on line 4—4 of Fig. 1.
Fig. 5 is an enlarged plan view of the forming or constricting assembly by which the paper is crumpled and shaped during its passage toward a compaction barrel, the view being taken on line 5—5 of Fig. 4.
Figs. 8 and 9 are horizontal sections through the funnel-like paper constricting section of the forming assembly taken on lines 8—8 and 9—9 respectively of Fig. 6.

As best seen in Fig. 4, shaft 53 is guided for vertical movement by passage through a tubular bearing sleeve 58, whose upper end portion is frictionally retained within a tubular portion 59 of the upper horizontal frame member 29. At its upper end, shaft 53 carries the vertically reciprocable plunger carrying head 14, which may be attached to the shaft by a transverse pin 60.

Head 14 has a first pair of diametrically opposite outwardly projecting lugs 61 (see Fig. 3) carrying a pair of diametrically opposite downwardly projecting insertion plungers 16. Each of these insertion plungers is of a diameter smaller than the internal diameter of the compaction cylinders 12 to be capable of displacing a sheet of paper into one of the cylinders in the manner illustrated in Fig. 20. The lower ends 63 of insertion plungers 16 are rounded as shown to present smooth surfaces to the paper for preventing the plungers from punching through the paper.

At locations spaced circularly from lugs 61, head 14 has a second pair of lugs 64 carrying a pair of downwardly projecting compaction plungers 17. These compaction plungers are of a diameter substantially equal to the internal diameter of compaction cylinders 12, and have hemispherical cavities 56 in their lower ends within which the upper portions of the paper balls are shaped. The compaction plungers are mounted to head 14 at locations spaced 60 degrees from the corresponding insertion plungers 16. Spaced 30 degrees from one of the compaction plungers, and carried by the same lugs 64 of the head, is an elongated downwardly projecting alining pin 67, adapted to aline the head, frame and turret during a downward movement of the head. This alining pin 67 is slightly tapered at its lower end to assure proper entry into a frame carried bushing 68 and into corresponding openings in the turret. The alining pin is slightly longer than any of the other plungers, so that it enters bushing 68 before the insertion or compaction plungers have commenced their effective strokes. The upper horizontal frame member 29 is apertured to pass the downwardly moving compaction plungers, and mounts the forming assemblies 15 at locations directly beneath the insertion plungers.

The rotary turret 11 may be constructed of upper and lower sections 69 and 70 suitably connected together, as by welding at 71. Upper section 69 of the turret is rotatably mounted about a lower portion of the bearing sleeve 58 by which head carrying shaft 53 is guided for its vertical movement. This upper section of the turret may bear at its upper side against a flange 72 on the bearing sleeve, and may be retained at its lower side by a washer 73, secured to the bearing by upsetting the lower end of the bearing at 74. The tubular compaction cylinders 12 extend through and are carried by a pair of upper and lower flanges 75 and 76 of the upper turret section. Midway between each pair of successive compaction cylinders 12, the upper flange 75 of the upper turret section contains an opening 140 (see Figs. 27 and 28) containing a bushing 141 into which alining pin 67 is movable upon downward movement of head 14.

The lower section 70 of the turret has a cylindrical outer wall 77, at the inside of which are received the lower portions of the turret carried plungers 18. The upper ends of these plungers, within the various compaction cylinders, are hemispherically cavitated at 118 in correspondence with the opposed bottom surfaces of compaction plungers 17. The cavities in plungers 17 and 18 thus serve together to shape the compacted paper pellets into essentially spherical balls.

At their lower ends, plungers 18 rest partially on an annular ledge 78 projecting inwardly from side wall 77 of the lower turret section. The inner portions of plungers 18 extend inwardly beyond ledge 78 for engagement, in certain conditions of the apparatus, with a pair of actuating elements 79 carried by cross-head 49. Each of these actuating elements includes a vertical pin portion 80 having a pair of mounting lugs 81 at its lower end pivotally connectable to one of the previously mentioned cross-head carried brackets 56 (see Figs. 4 and 10). A pair of springs 282 yieldingly urge the actuating elements 79 toward their full line positions of Fig. 10, in which their pin portions 80 are received beneath and engage the underside of two of the plungers 18.

During each upstroke of the cross-head, elements 79 are in their full line positions of Fig. 10 beneath a pair of diametrically opposite plungers 18, to transmit the upward movement of the cross-head to those plungers. The upward movement of the plungers ejects a pair of previously formed balls from two of the cylinders 12. During the initial stages of the subsequent down stroke, rotational advancement of the turret shifts the raised plungers 18 away from elements 79 to permit downward movement of those plungers onto ledge 78. Such rotation also shifts a second pair of plungers 18 into engagement with the pin portions 80 of elements 79, to deflect those elements inwardly to their broken line positions of Fig. 10. At the bottom of the cross-head down stroke, the actuating elements move outward beneath this second pair of plungers 18 in position to elevate them upon the next upstroke.

For producing rotation of turret 11 in accordance with the vertical reciprocation of cross-head 49, shaft 53 and plunger carrying head 14, we provide a cam 82 mounted to the cross-head and engageable successively with a series of rollers 83 carried at spaced locations about the turret. When six compaction cylinders are employed, there are six equally spaced rollers 83, each preferably being mounted by a pin 84 received in a corresponding tubular mounting portion 85 of the lower turret section. The cam is preferably shaped as seen in Fig. 12, having a curved under surface 86 adapted to engage one of the rollers upon each downward movement of the cross-head and displace the roller in a turret advancing direction between a pair of successive positions. Upon the subsequent upward movement of the cross-head, the cam is deflected outwardly to its broken line position of Fig. 10 for upward movement past the next successive roller without effect upon the rotary position of the turret. That is, the cam is effective to rotate the turret only on downward movement of the cross head, being deflected to an inactive position during upward cross-head movement.

To provide for such outward deflection of the cam to an inactive position, the cam is mounted near its upper end by a hinge 87 for swinging movement about a vertical axis. The hinge mounting 87 is carried by an upstanding support member 88 attached at its lower end to the cross-head by bolts 89. A second or reinforcing support 90 may extend upwardly from an opposite side of the cross-head and be connected to support 88 by an upper cross piece 91.

The cam is normally urged to its active full line condition of Fig. 10 by spring 92 contained within a tubular housing 93 carried by support 88. This spring urges a sliding plug 94 against an ear 95 on the cam to swing the cam inwardly toward the turret. For effecting outward deflection of the cam upon upward movement of the cross-head, the cam is provided with an upwardly and outwardly extending wedge projection 96. As will be appreciated, upon upward movement of the cross-head and cam, wedge projection 96 engages one of the rollers in a manner deflecting the cam outwardly to its inactive condition.

The turret is releasably retained in each of its rotary positions by a detent element 97 pivotally carried by a mounting bracket 98 clamped about one of the frame posts 25. This detent element has a notch 99 in its under surface within which the rollers are successively receivable. Spring 100 urges the detent element downwardly into engagement with a roller to retain the turret in any one of its six active rotary positions.

Figures 6, 7, 17, 18, 19, 20, 21, 22:
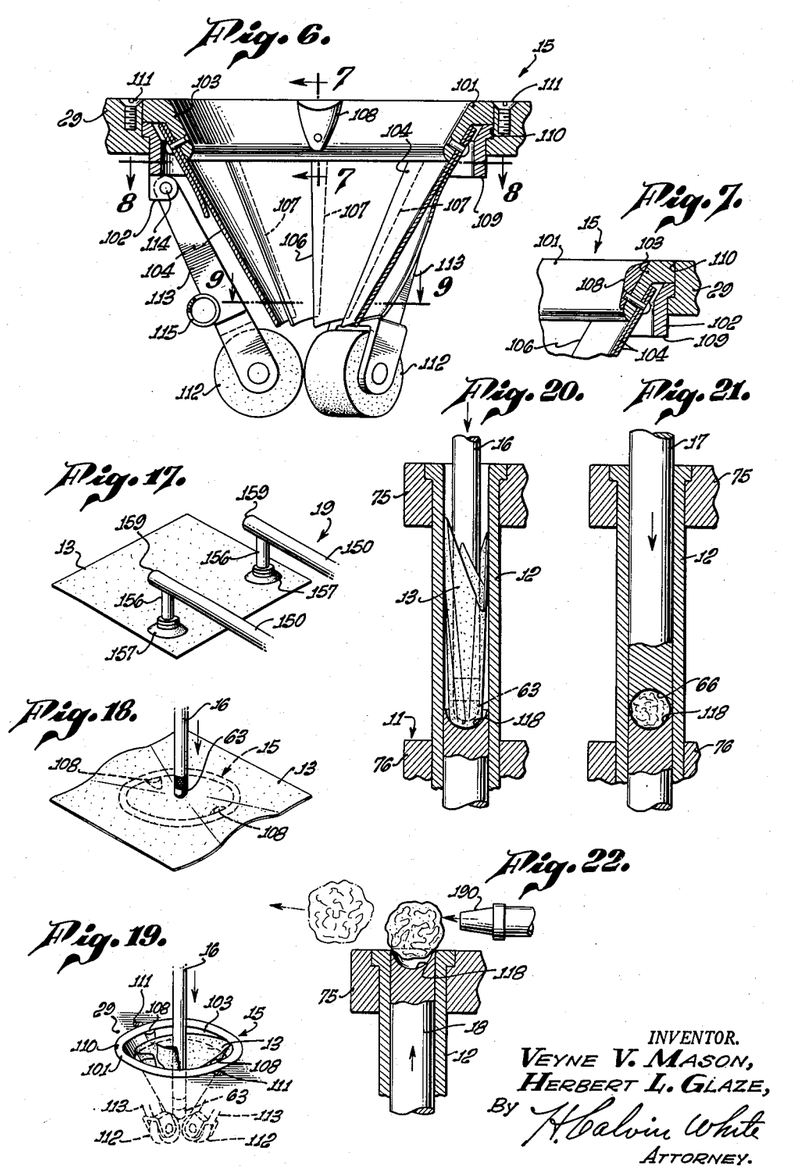
Fig. 6 is a further enlarged vertical section through the forming assembly and taken on line 6—6 of Fig. 5.
Fig. 7 is a fragmentary vertical section taken on line 7—7 of Fig. 6 and showing especially one of the lugs of the forming assembly by which a fold in the paper is started.
Fig. 17 is a fragmentary perspective view showing the manner in which a sheet of paper is held by the feeding unit during its transfer from the supply stack to a location above the forming assembly.
Fig. 18 shows a sheet of paper immediately after its first engagement by the downwardly moving insertion plunger.
Fig. 19 shows the paper after it has been forced downwardly by the insertion plunger into the funnel-like section of the forming assembly.
Fig. 20 illustrates the plunger and paper after further downward movement into the compaction cylinder.
Fig. 21 shows the condition of the paper after the compaction plunger has moved downwardly within the cylinder to the bottom of its stroke.
Fig. 22 represents the manner in which the compacted ball is ejected from the cylinder.

As a sheet of paper is displaced downwardly by one of the insertion plungers toward one of the compaction cylinders, the paper is progressively crumpled and constricted into the elongated form of Fig. 20. Such constriction of the paper is effected by the forming assembly 15 shown in Figs. 5 through 9. The apparatus includes two such forming assemblies carried by the upper horizontal frame member 29 at locations beneath the two insertion plungers 16. Each forming assembly includes an upper funnel-like section 101 and a lower roller carrying section 102. Section 101 comprises an annular essentially frusto-conical ring 103 carrying a series of converging circularly positioned sheet metal members 104. The members 104 are carried by ring 103 in circularly overlapping relation, but with their adjacent edge portions radially spaced to permit the passage of folds in the paper outwardly between those spaced edges. Each member 104 extends both circularly and radially outwardly to present an inner edge 106 spaced inwardly from one adjacent member and an outer edge 107 spaced outwardly from a second adjacent member. Preferably, the spaces 105 between adjacent edge portions of the members become progressively wider toward the bottom of the funnel unit, to accommodate the progressively enlarging folded portions of the paper. To start the folds in a sheet of paper as the paper is first displaced downwardly into the funnel unit, upper ring 103 of that unit may carry two or more inwardly projecting rounded lugs 108. The action of these lugs in locally engaging and starting folds in the paper is illustrated in Fig. 18.

The lower roller carrying section 102 of the forming assembly includes a ring 109 received beneath ring 103 of the upper section within a circular opening 110 in the upper frame member 29. Both rings are retained within this opening by a pair of screws 111 tightened against the upper ring at a pair of diametrically opposite locations. Ring 109 carries three or more rollers 112, each individually mounted by an arm 113 pivoted to the ring at 114. The various arms 113 and their carried rollers are yieldingly urged radially inwardly by a coil spring 115 extending about all of the arms. The rollers thus serve to engage and further constrict the paper after its passage through the funnel section.

As the machine operates, individual sheets of paper, preferably about 5 inches square, are successively fed to positions of extensions across the upper sides of the two forming units from two supply stacks 13a in a pair of vertically elongated paper holders or guides 117. These paper holders are mounted in any suitable manner to the frame, as by support on a tray 118 carried by a pair of arms 119 attached by screws 120 to the vertical frame posts 25. At their upper ends, paper holding guides 117 may be attached to individual U-shaped bracket members 121 secured by screws 122 to the upper horizontal frame member 29.

Each of the stacks 13a of paper sheets is supported within its holder 117 by a vertically movable support plate 123 carried at the upper end of a rod 124 of square horizontal section. This rod projects downwardly through an opening in tray 118 and through a pair of tray carried guide blocks 125 and 126, by which the rod is guided for only vertical movement. Blocks 125 and 126 may be interconnected at their opposite sides by a pair of side plates 127. At its underside, tray 118 carries a downwardly extending bracket member 128 loosely carrying a holding member 129 containing a slightly oversized opening 130 (see Fig. 24) through which rod 124 extends. As will be appreciated, member 129 serves to retain rod 124 against downward movement while permitting its upward movement.

To assure that the upper sheet in each of the stacks is at all times in condition to be picked up by the later described paper feeding mechanism, I provide mechanism for elevating the stack in acordance with the movement of a feeler 131 engaging the top of the stack. This stack advancing mechanism includes a plate-like vertically movable member 132 having a slightly oversized square opening 232 through which rod 124 passes. Member 132 serves upon upward movement to engage and elevate rod 124 and the stack, while being free for downward movement relative to the rod. Member 132 is pivotally mounted at 133 to the upper end of a link 134, which in turn is pivotally mounted at 135 to a horizontally extending arm 136. The two arms 136 of the two stack advancing mechanisms are pivotally mounted to the frame at their rear ends 137 and are interconnected for swinging movement together by a transverse connecting member 138. One of the arms 136 is formed integrally at its rear end with an upwardly projecting arm 138, to form with that arm an angular lever by which upward advancement of the paper stacks is effected. This lever 136, 138 is actuated, upon upward movement of cross-head 49 and its associated parts, by engagement of a cross-head carried roller 139 with the upwardly projecting arm 138. Such engagement of roller 139 with arm 138 swings lever 136, 138 in a clockwise direction, as seen in Fig. 23, to elevate the paper stacks through a short predetermined distance.

Figures 23, 24:
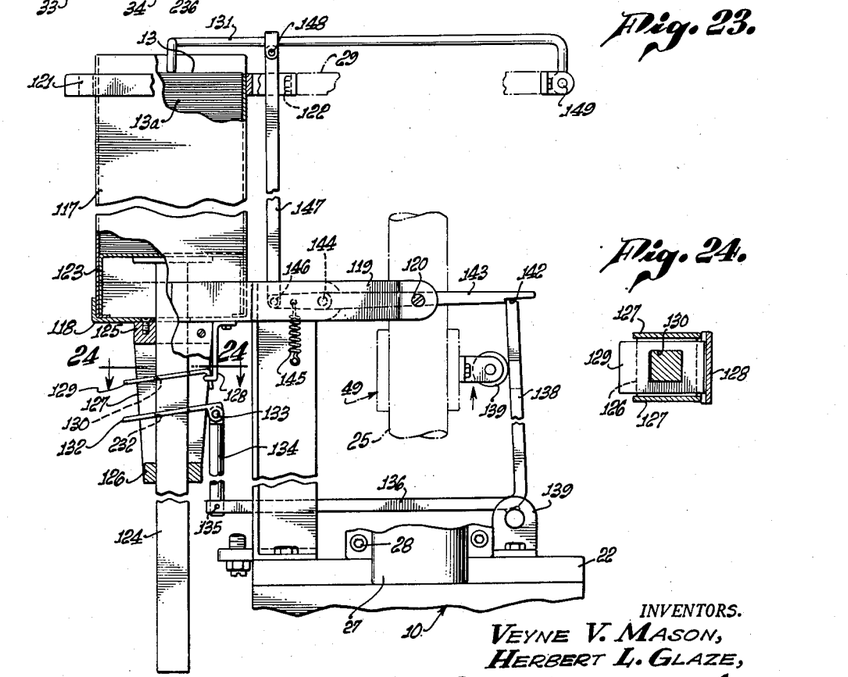
Fig. 23 is an enlarged fragmentary view of the paper stack holding and feeding mechanism.
Fig. 24 is a horizontal section taken on line 24—24 of Fig. 23.

When the upper sheets of the paper stacks are positioned at a proper level, arm 138 is latched in the inactive condition of Fig. 23 by engagement of its upper end with shoulder 142 of latch lever 143. In this condition of the mechanism, arm 138 is held out of the path of roller 139, so that the arm is not actuated and the stacks are not elevated by reciprocation of the roller with the cross-head. Latch lever 143 is pivotally mounted to the frame at 144 and is urged by spring 145 in a releasing direction. At its left end 146, as seen in Fig. 23, lever 143 is pivotally connected to the lower end of a link 147, whose upper end is pivotally connected at 148 to the previously mentioned paper engaging feeler 131. This feeler is pivotally mounted to the frame at 149 for vertical swinging movement in accordance with the positioning of the upper sheets in the stacks.

By virtue of the described linkage, downward movement of feeler 131, as the upper sheets of the stacks are removed, swings lever 143 in a counter-clockwise direction to release arm 138 for movement to its broken line position of Fig. 23. When the arm is in that position, it is actuable in a stack elevating direction upon each upward stroke of cross-head 49 and roller 139. One or more of such actuations raise the stacks to a proper level in which feeler 131 swings lever 143 to its Fig. 23 condition, to again render the lever 136, 138 inactive. Thus, the upper sheets of paper stacks are at all times maintained at substantially a predetermined level.

The paper delivery unit 19 (see Figs. 1 through 3) includes two pairs of parallel tubes 150, one of which pairs is associated with each of the paper stacks. The tubes 150 are rigidly interconnected at spaced locations near their rear ends by two transverse rods 151 and 152, which form with the tubes 150 a rigid carriage to be bodily moved between paper pickup and paper delivery locations. Each of the tubes may typically be connected to each of the transverse rods by an individual connecting fitting 153.

At their rear ends, the tubes 150 are connected into a transverse tubular header 154, to which compressed air is supplied through hose 155. Near their forward ends, tubes 150 carry individual depending pickup tubes 156, to the lower ends of which are attached suction cup elements 157 (Fig. 29). At a location above its tube 156, each tube 150 contains a restricted jet tube 158, by which a stream of air is directed out the open forward end of the tube 150, to create an ejector effect producing a paper holding vacuum at suction cups 157. The admission of compressed air to tubes 150 through header 154 is controlled by the previously mentioned cam 40 and its associated valve 43. When the paper delivery unit or carriage 19 is moved to a position in which suction cups 157 are above the stacks, cam 40 opens valve 43 to admit compressed air to tubes 150 and thus produce a paper holding vacuum at the suction cups. The carriage is then bodily moved to the Figs. 1 and 3 delivery position, at which valve 43 closes to break the vacuum at the suction cups and drop the two paper sheets to their insertion positions of extension across the upper ends of forming assemblies 15.

The paper delivery unit 19 is moved horizontally between its paper pickup and delivery positions by swinging movement of a pair of vertically extending arms 160, whose upper ends are pivotally connected to the opposite ends of rod 151 at 161. The lower ends 162 of arms 160 are rigidly connected to a transverse shaft 163, journalled at its opposite ends in frame mounted bearings 164. Actuation of shaft 163 and arms 160 is effected by vertical swinging movement of an arm 165, rigidly connected at 166 to the shaft and carrying at its opposite end a cam following roller 167. The movement of roller 167 is controlled by a cam assembly 168 carried by the main gear wheel 37 (see Figs. 14 through 16).

As the paper delivery unit 19 reaches both its pickup and delivery locations, the unit is pivoted slightly about its mounting to arms 160 in a manner slightly lowering the suction cups, to assure proper pickup or delivery of the paper. Such swinging movement of unit 19 is effected by actuation of a vertically extending link 169, which is pivotally connected at its upper end 170 to the rear transverse rod 152 of the delivery unit. The lower end of link 169 is pivotally connected at 171 to one end of a double ended lever 172, pivoted about shaft 163. The opposite end of lever 172 carries a roller 173 engaging and following cam assembly 168.

Figures 14, 15, 16:
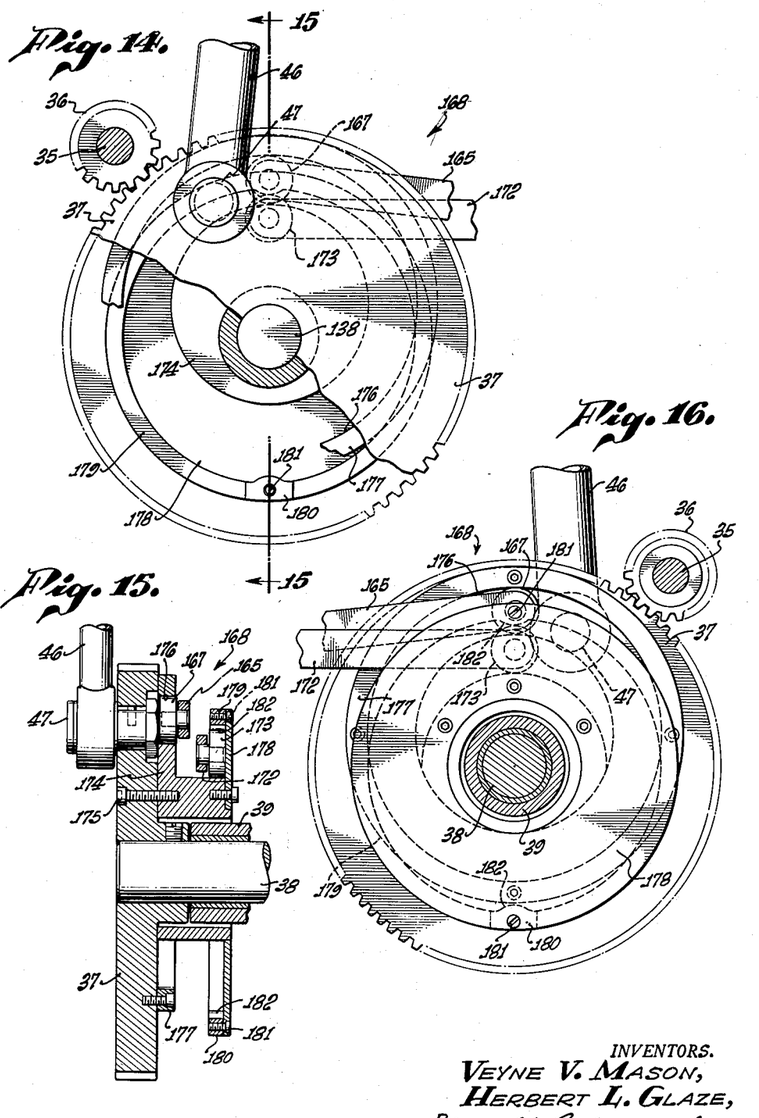
Fig. 14 is an enlarged fragmentary view of the head driving gear and associated cam for actuating the paper feed mechanism, the view being taken mainly along line 14—14 of Fig. 2.
Fig. 15 is a transverse section taken on line 15—15 of Fig. 14.
Fig. 16 is an enlarged fragmentary view taken along line 16—16 of Fig. 2.

Referring particularly to Figs. 14 through 16, cam assembly 168 includes a body member 174 secured by bolts 175 to gear 37. This cam body has an outer eccentric surface 176 along which follower roller 167 moves. Spaced radially outwardly from surface 176 of the cam body, gear wheel 37 carries an eccentrically mounted ring 177 for engaging the outer surface of roller 167. Roller 167 is thus confined between eccentric surface 176 and eccentric ring 177, and as a result is vertically reciprocable in response to rotation of gear 37. Such reciprocation of roller 167 actuates arm 165 and arms 160 in a manner to move paper delivery unit 19 between its pickup and delivery locations.

At its outer end, cam body 174 carries an annular plate 178, to which is mounted a sectionally formed cam ring 179. The inner surface of this cam ring, which is engaged and followed by roller 173, is cylindrical and concentric with gear 37 along most of its circular extent. The only irregularities in this inner cam surface are provided by a pair of diametrically opposed insert sections 180 of the ring, which may be separately attached to plate 178 by individual screws 181. Each of these insert sections of the cam ring has an inner rounded projection 182, which momentarily actuates roller 173 downwardly to depress the suction cups through linkage 172, 169. As will be understood, one of the lugs 182 actuates roller 173 when unit 19 has been moved by arms 160 to its pickup position, while the other lug momentarily actuates the roller when unit 19 has been moved to the delivery location.

In order to place the machine in operation, it is necessary merely to insert a pair of stacks 13a of paper sheets in the two holders 117, and then energize motor 32. Such energization of the motor drives belt 33, pulley 34 and gears 36 and 77. As gear 37 rotates, its associated cam assembly 163 actuates the paper delivery unit 19 in the above described manner, to successively deliver individual sheets of paper from stacks 13a to the insertion locations above forming units 15. At the same time, cam 40 actuates valve 43 to admit suction creating air to the delivery unit for picking up a sheet from the stack and then depositing it at the insertion location. A second cam 41 controls a second valve 44, which admits air to a pair of paper ruffling heads 183 positioned alongside the two paper stacks. Each of these heads has a side slot 184 through which a stream of air is directed just prior to the picking up of a sheet by suction cups 157, to ruffle the paper sheets in a manner assuring that only one will be picked up.

As gear 37 rotates, it vertically reciprocates cross-head 49, shaft 53 and the upper plunger carrying head 14. The delivery of paper sheets to the insertion locations above forming assemblies 15 is effected during the upstroke of these reciprocating parts. During each downstroke of the head and other parts, the two insertion plungers 62 displace a pair of paper sheets downwardly through the two forming assemblies and into a pair of compaction cylinders 12 then positioned beneath the forming assemblies. As brought out previously, the funnel-like upper sections 101 of the forming assemblies act to progressively radially constrict the paper, and the rollers 112 then further constrict the paper which is delivered into the compaction cylinders in the elongated form of Fig. 20. While the insertion plungers are thus displacing a pair of sheets into two of the six compaction cylinders, the compaction plungers 65 are, during the same down stroke of the head, compacting the already inserted paper within two other cylinders (see Fig. 21). During the return or upstroke of the head, actuating elements 79 engage the bottom plungers 18 in the third pair of compaction cylinders to move those bottom plungers upwardly to the condition of Fig. 22 for ejecting the compacted paper balls from these cylinders. As bottom plungers 18 reach their Fig. 22 positions, cam 42 opens valve 45 (Fig. 2) to admit air to frame carried nozzles 190, for producing streams of air adapted to blow the ejected paper balls from their Fig. 22 positions toward a discharge location. Nozzles 190 are so mounted to the frame as to be positioned adjacent the upper ends of the compaction cylinders in their ejection positions.

During the initial part of each cross-head downstroke, cam 82 engages one of the turret carried rollers 83 to rotate the turret through a 60 degree angle. Such rotation of the turret positions each of the compaction cylinders for the proper operation on that stroke. That is, those cylinders into which paper has been inserted on the previous downstroke are rotated by the cam into positions beneath the compaction plungers, so that the paper is then compacted within the cylinders. Similarly, those cylinders in which compaction has already taken place are advanced to ejection locations, and those cylinders from which balls have just been ejected are moved to insertion locations beneath plungers 62.

We claim:

1. Apparatus comprising a converging funnel-like forming unit, means operable to force a sheet of material through said forming unit to progressively constrict the material into an elongated folded mass, said funnel-like unit comprising a plurality of members engageable with said material and progressively converging in the direction of movement of said material through the unit, said members having spaced edges between which folds in said material are received as the material is forced through the unit, and means then acting to engage and longitudinally compact said elongated mass of material.

2. Apparaus for forming pellets of crumpled sheet material comprising a compaction chamber having an open end, a funnel-like forming unit converging toward said open end of the chamber in one condition of the apparatus, means for exerting against a sheet of material extending across said funnel-like unit a force for displacing the sheet therethrough and into the chamber, an element relatively movable in said chamber and acting by said movement to crumple and compact the sheet therein, and means mounting said element for said movement, said funnel-like unit comprising a plurality of members engageable with said material and progressively converging in the direction of movement of said material through the unit, each of said members having a first edge portion at one side spaced radially outwardly from an edge of an adjacent member, and having an opposite edge portion spaced radially inwardly from the edge of a second adjacent member, folds in the material being received between said spaced edges of the members as the material is forced through the unit.

3. Apparatus for forming pellets of crumpled sheet material comprising a compaction chamber having an open end, a funnel-like forming unit converging toward said open end of the chamber in one condition of the apparatus, means for exerting against a sheet of material extending across said funnel-like unit a force for displacing the sheet therethrough and into the chamber, a member relatively movable in said chamber and acting by said movement to crumple and compact the sheet therein, and means mounting said member for said movement, said funnel-like unit comprising a plurality of converging sheet metal circularly overlapping members, each of said members having a first edge portion at one side spaced radially outwardly from an edge of an adjacent member, and having an opposite edge portion spaced radially inwardly from the edge of a second adjacent member, folds in the material being received between said spaced edges of the members as the material is forced through the unit, said edges being spaced progressively farther apart toward the smaller end of the funnel-like unit.

4. Apparatus including a converging funnel-like forming unit, means operable to force a sheet of material through said forming unit to progressively constrict the material into an elongated folded mass, and a lug near the entrance end of the funnel-like unit for engaging the material and starting a fold therein as the material is displaced into the unit, said apparatus including members operable after said constriction of the material to engage said elongated mass at spaced locations therealong and exert longitudinal crumpling force thereagainst.

5. Apparatus for forming pellets of crumpled sheet material comprising a compaction chamber having an open end, a funnel-like forming unit converging toward said open end of the chamber in one condition of the apparatus, a plunger mounted for movement through said unit and into the chamber to advance a sheet of material extending across said funnel-like unit through the unit and into the chamber, a plurality of rollers positioned about the plunger path between the funnel-like unit and the chamber for engaging the material and retaining it in a constricted condition, and a member relatively movable in said chamber and acting by said movement to crumple and compact the sheet therein, and means mounting said member for said movement.

6. Apparatus for forming pellets of crumpled sheet material comprising a compaction chamber having an open end, a funnel-like forming unit converging toward said open end of the chamber in one condition of the apparatus, means for exerting against a sheet of material extending across said funnel-like unit a force for displacing the sheet therethrough and into the chamber, means exerting a yielding force inwardly against the material between the funnel-like unit and the chamber, a member relatively movable in said chamber and acting by said movement to crumple and compact the sheet therein, and means mounting said member for said movement.

7. Apparatus for forming pellets of crumpled sheet material comprising a compaction chamber having an open end, a forming unit containing a throat directed and progressively decreasing in transverse dimension toward said end of the chamber, means operable to advance a sheet of material through said throat for constriction thereby into an elongated folded mass and then into said end of the chamber, a member then relatively movable in said chamber and acting by said movement to longitudinally crumple and compact said elongated mass, means mounting said member for said movement, and means separate from said first mentioned means and said member for exerting against the compacted material in the chamber a force for ejecting the material therefrom.

8. Apparatus for forming pellets of crumpled sheet material comprising a tubular compaction barrel, having an open end, a forming unit containing a throat directed and progressively decreasing in transverse dimension toward said end of the barrel, a first plunger movable through said throat and into said end of the barrel and operable by said movement to displace a sheet of material through the throat for constriction thereby into an elongated folded mass and then into the barrel, a second plunger relatively movable in said barrel and acting by said movement to longitudinally crumple and compact said elongated mass therein, means mounting said plungers for said movements, and a third plunger relatively movable in the barrel to eject the crumpled and compacted material therefrom.

9. Apparatus for forming pellets of crumpled sheet material comprising a tubular compaction barrel, a first movable plunger extending into a first end of the barrel, a second plunger movable into the opposite end of the barrel to displace a sheet of material thereinto, a third plunger then movable into said opposite end of the barrel and toward the first plunger to crumple and compact the sheet into a pellet, said first and third plungers having opposed cavitated end surfaces for forming the compacted sheet into a pellet of predetermined shape, said first plunger being movable axially in the barrel to eject the pellet therefrom, and mechanism for actuating said plungers in predetermined timed relation.

10. Apparatus for forming pellets of crumpled sheet material comprising a compaction chamber having an open end, means for exerting against a sheet of material a force for displacing the sheet into the chamber through said open end thereof, a member in addition to said means relatively movable in said chamber and acting by said movement to crumple and compact the sheet therein, means mounting said member for said movement, means for ejecting the crumpled material from the chamber to a location at the outside thereof, and means in addition to said ejecting means for displacing the material from said location in a discharge direction 11. Apparatus for forming pellets of crumpled sheet material comprising a compaction chamber having an open end, means for exerting against a sheet of material a force for displacing the sheet into the chamber through said open end thereof, a member relatively movable in said chamber and acting by said movement to crumple and compact the sheet therein, means mounting said member for said movement, said apparatus including a plunger relatively movable in the chamber to eject the crumpled and compacted material therefrom through said open end and to a location at the outside thereof, and means forming an air passage discharging a stream of air against the material at said location to displace it in a discharge direction.

12. Apparatus for forming pellets of crumpled sheet material comprising a compaction chamber having an open end, a forming unit containing a throat directed and decreasing in transverse dimension toward said end of the chamber, means operable to advance a sheet of material from a location at the entrance to said throat through the throat for constriction thereby into an elongated crumpled mass and then into said end of the chamber, a member in addition to said means relatively movable in said chamber and acting upon said movement to longitudinally crumple and compact said elongated mass within the chamber, means mounting said member for said movement, means for holding a supply of said sheets of paper, and mechanism for successively feeding the sheets from said supply to said location.

13. Apparatus for forming pellets of crumpled sheet material comprising a compaction chamber having an open end, a forming unit containing a throat directed and decreasing in transverse dimension toward said end of the chamber, means operable to advance a sheet of material from a location at the entrance to said throat through the throat for constriction thereby into an elongated crumpled mass and then into said end of the chamber, a member in addition to said means relatively movable in said chamber and acting upon said movement to longitudinally crumple and compact said elongated mass within the chamber, means mounting said member for said movement, means for holding a stack of sheets to be successively fed to said location, a feeding member having a suction pick-up portion for holding a sheet of material and movable between a pick-up position and said location at the outside of the chamber, and mechanism operable to move said feeding member between said pick-up position and said location in predetermined timed relation to the actuation of said compacting member.

14. Apparatus for forming pellets of crumpled sheet material comprising a compaction chamber having an open end, a forming unit containing a throat directed and decreasing in transverse dimension toward said end of the chamber, means operable to advance a sheet of material from a location at the entrance to said throat through the throat for constriction thereby into an elongated crumpled mass and then into said end of the chamber, a member in addition to said means relatively movable in said chamber and acting upon said movement to longitudinally crumple and compact said elongated mass within the chamber, means mounting said member for said movement, means for holding a stack of sheets to be successively fed to said location, a feeding member having a suction pick-up portion for holding a sheet of material and movable between a pick-up position and said location at the outside of the chamber, mechanism operable to move said feeding member between said pick-up position and said location in predetermined timed relation to the actuation of said compacting member, a valve for controlling the paper holding suction at said pick-up portion of the feeding member, and mechanism for actuating said valve in predetermined timed relation to the actuation of said feeding member moving mechanism.

15. Apparatus for forming pellets of crumpled sheet material comprising a compaction chamber having an open end, a forming unit containing a throat directed and decreasing in transverse dimension toward said end of the chamber, means operable to advance a sheet of material from a location at the entrance to said throat through the throat for constriction thereby into an elongated crumpled mass and then into said end of the chamber, a member in addition to said means relatively movable in said chamber and acting upon said movement to longitudinally crumple and compact said elongated mass within the chamber, means mounting said member for said movement, a movable support for holding a stack of sheets, means for successively feeding said sheets from an end of the stack to said location in predetermined timed relation to the operation of said compacting member, a movable feeler for engaging said end of the stack, means for moving said support to progressively advance the stack as the sheets are removed therefrom, and mechanism for actuating said support moving means in accordance with the movements of said feeler.

16. Apparatus for forming pellets of crumpled sheet material comprising a compaction chamber having an open end, means for inserting a sheet of material into the chamber from a location at the outside thereof and then crumpling and compacting the material within the chamber into a pellet, said means including a member reciprocable relative to the chamber, a movable support for holding a stack of sheets, means for successively feeding said sheets from an end of the stack to said location, mechanism operable to advance said stack as the sheets are removed therefrom, and mechanism operable to actuate said stack advancing mechanism in predetermined timed relation to the relative reciprocation of the chamber and said member.

17. Apparatus for forming pellets of crumpled sheet material comprising a compaction chamber having an open end, a forming unit containing a throat directed and decreasing in transverse dimension toward said end of the chamber, means operable to advance a sheet of material from a location at the entrance to said throat through the throat for constriction thereby into an elongated crumpled mass and then into said end of the chamber, a member in addition to said means relatively movable in said chamber and acting upon said movement to longitudinally crumple and compact said elongated mass within the chamber, and mechanism operable to actuate said force exerting means and said member in predetermined timed relation.

18. Apparatus for forming pellets of crumpled sheet material comprising a pair of body sections relatively movable between first and second relative positions, mechanism for relatively moving said sections between said positions, a first one of said sections containing a compaction chamber having an open end, a forming unit containing a throat directed and progressively decreasing in transverse dimension toward said end of the chamber when the sections are in said first relative position, means operable when the sections are in said first relative position to displace a sheet of material through said throat for constriction thereby into an elongated folded mass and then into the chamber, a member in addition to said means carried by the second section and relatively movable in said chamber to longitudinally crumple and compact said elongated mass therein, said member being positioned for said movement when the sections are in said second relative position, and mechanism for actuating said section moving mechanism, said force exerting means and said member in predetermined timed relation.

19. Apparatus for forming pellets of crumpled sheet material comprising a pair of body sections mounted for relative movement toward and away from each other along an axis, said sections being relatively movable transversely of said axis between a pair of relative transverse positions, a first one of said sections containing a compaction chamber having an open end, a forming unit containing a throat converging toward said open end of the chamber and a pair of plungers carried by and movable with the other of said sections, one of said plungers being movable through said throat and into the compaction chamber to crumple a sheet of material into an elongated mass and displace it into the chamber upon relative movement of the sections toward each other when in said first relative transverse position, and the other plunger being movable into the chamber and acting to longitudinally compact the mass therein upon relative movement of the sections toward each other when in said second relative transverse position.

20. Apparatus for forming pellets of crumpled sheet material comprising a pair of sections mounted for relative rotation about an axis and for relative movement toward and away from each other along said axis, a compaction barrel having an open end and carried by one of said sections, a forming unit containing a throat converging toward said open end of the barrel a pair of plungers carried by the other section, one of said plungers being movable through said throat and into the barrel upon relative reciprocation of the sections when in a first relative rotative position to crumple a sheet of material thereinto, the other plunger being movable into the barrel upon relative reciprocation of the sections when in a second relative rotative position to longitudinally compact the mass, and mechanism operable to relatively reciprocate and rotate said sections in predetermined timed relation.

21. Apparatus for forming pellets of crumpled sheet material comprising a pair of sections mounted for relative rotation about an axis and for relative movement toward and away from each other along said axis, a compaction barrel having an open end and carried by one of said sections, a forming unit containing a throat converging toward said open end of the barrel a pair of plungers carried by the other section, one of said plungers being movable through said throat and into the barrel upon relative reciprocation of the sections when in a first relative rotative position to crumple a sheet of material into an elongated folded mass and displace it into the barrel, the other plunger being movable into the barrel upon relative reciprocation of the sections when in a second relative rotative position to longitudinally compact the mass, a third plunger relatively movable in the barrel to eject the crumpled material therefrom when the sections are in a third relative rotative position, and mechanism for relatively rotating the sections between said three positions and relatively reciprocating the sections in predetermined timed relation.

22. Apparatus for forming pellets of crumpled sheet material comprising a pair of body sections mounted for relative movement toward and away from each other along an axis, said sections being relatively movable transversely of said axis between a pair of relative transverse positions, a first one of said sections containing a compaction chamber having an open end, a forming unit containing a throat converging toward said open end of the chamber a pair of plungers carried by and movable with the other of said sections, one of said plungers being movable through said throat and into the compaction chamber to crumple a sheet of material into an elongated folded mass and displace it into the chamber upon relative movement of the sections toward each other when in said first relative transverse position, and the other plunger being movable into the chamber and acting to longitudinally compact the mass therein upon relative movement of the sections toward each other when in said second relative transverse position, and a locating pin carried by one of said sections and movable into an opening in the other section upon movement of the sections together to relatively position the sections.

23. Apparatus for forming pellets of crumpled sheet material comprising a pair of sections mounted for relative rotation about and relative reciprocation along an axis, a first of said sections containing a compaction chamber having an open end, means for forming a sheet of material into a crumpled pellet in the chamber and adapted to perform different operations on the material in different relative rotative positions of the sections, said means including a plunger carried by the second section and acting to move within said chamber and act against said material therein upon relative reciprocation of the sections, and mechanism for relatively rotating the sections between said positions, said rotating mechanism including a cam carried by one of the sections for axial movement therewith relative to the other section and engageable by the other section upon relative axial movement in a first direction to effect relative rotation of the sections.

24. Apparatus for forming pellets of crumpled sheet material comprising a pair of sections mounted for relative rotation about and relative reciprocation along an axis, a first of said sections containing a compaction chamber having an open end, means for forming a sheet of material into a crumpled pellet in the chamber and adapted to perform different operations on the material in different relative rotative positions of the sections, said means including a plunger carried by the second section and acting to move within said chamber and act against said material therein upon relative reciprocation of the sections, and mechanism for relatively rotating the sections between said positions, said rotating mechanism including a cam carried by one of the sections for axial movement therewith relative to the other section and engageable by the other section upon relative axial movement in a first direction to effect relative rotation of the sections, said cam having a movable portion deflectible out of the path of the other section upon relative axial movement of the sections in a reverse direction.

25. Apparatus for forming pellets of crumpled sheet material comprising a frame, a member mounted to the frame for rotation about a vertically extending axis, a tubular compaction barrel carried by said member, a shaft projecting upwardly through said member along said axis and adapted for vertical reciprocation along the axis, a head carried by and reciprocable with the shaft above the member, a funnel-like forming unit converging toward an open upper end of the barrel when the member is in a first rotary position, an insertion plunger carried by the head and movable through the forming unit and into the barrel upon downward movement of the head when the member is in said first rotary position, said first plunger being of a transverse dimension smaller than the barrel and acting to displace a sheet of material from a position of extension across the upper end of said forming unit downwardly therethrough and into the chamber, a second plunger carried by the head and movable into the barrel upon downward movement of the head when the member is in a second rotary position, said second plunger being of a transverse dimension substantially corresponding to the barrel to compact the sheet therein, a third plunger extending upwardly into the lower end of the barrel and against which the material is compacted by said second plunger, said third plunger being movable upwardly in the barrel to eject the compacted material therefrom, mechanism operable to actuate said third plunger upwardly in a third rotary position of the member, and mechanism operable to rotate said member, reciprocate the shaft and head, and actuate said last mentioned mechanism in predetermined timed relation.

26. Apparatus comprising a forming unit containing a throat of progressively decreasing transverse dimension, means including a movable member operable to advance a sheet of material through said throat to progressively transversely crumple the material into an elongated folded mass, said unit and means being constructed to form folds in said material extending longitudinally of said mass upon said advancement of the material through said throat, means engaging said elongated folded mass at spaced locations therealong and exerting longitudinal crumpling force thereagainst, and mechanism operable to actuate said advancing means and said last mentioned means in predetermined timed relation.

27. Apparatus comprising a forming unit containing a throat of progressively decreasing transverse dimension, means including a movable member operable to advance a sheet of material through said throat to progressively transversely crumple the material into an elongated folded mass, and roller means laterally engaging said elongated folded mass at a location beyond said forming unit and retaining the mass at said location in transversely crumpled condition.

28. Apparatus comprising a forming unit containing a throat of progressively decreasing transverse dimension, means including a movable member operable to advance a sheet of material through said throat to progressively transversely crumple the material into an elongated folded mass, and a plurality of rollers laterally engaging different sides of said elongated mass at a location beyond said unit and forming therebetween a constriction to retain the mass at said location in transversely crumpled condition.

References Cited in the file of this patent

UNITED STATES PATENTS

| Number | Name | Date |
|---|---|---|
| 1,762,661 | Low | June 10, 1930 |
| 2,057,243 | May | Oct. 13, 1936 |
| 2,105,412 | Edwards | Jan. 11, 1938 |
| 2,106,864 | Balton | Feb. 1, 1938 |
| 2,179,742 | Heres | Nov. 14, 1939 |
| 2,217,335 | Eden | Oct. 8, 1940 |
| 2,227,816 | Von Hofe | Jan. 7, 1941 |
| 2,371,498 | Boynton | Mar. 13, 1945 |
| 2,380,084 | Strauss | July 10, 1945 |
| 2,530,670 | Von Hofe | Nov. 21, 1950 |

FOREIGN PATENTS

| Number | Country | Date |
|---|---|---|
| 20,680/34 | Australia | July 18, 1935 |
| 663,612 | Germany | Aug. 10, 1938 |